(12) United States Patent
Hoffmann

(10) Patent No.: US 7,233,244 B2
(45) Date of Patent: Jun. 19, 2007

(54) ALARM AND CONTROL SYSTEM FOR A SWITCH CABINET

(75) Inventor: Rainer Hoffmann, Langenfeld (DE)

(73) Assignee: EMKA Beschlagteile GmbH & Co. KG (DE)

( * ) Notice: Subject to any disclaimer, the term of this patent is extended or adjusted under 35 U.S.C. 154(b) by 251 days.

(21) Appl. No.: 10/509,535

(22) PCT Filed: Mar. 20, 2003

(86) PCT No.: PCT/DE03/00928

§ 371 (c)(1),
(2), (4) Date: Sep. 24, 2004

(87) PCT Pub. No.: WO03/000928

PCT Pub. Date: Oct. 2, 2003

(65) Prior Publication Data

US 2005/0116819 A1    Jun. 2, 2005

(30) Foreign Application Priority Data

Mar. 26, 2002 (DE) .......................... 202 04 858 U

(51) Int. Cl.
*G08B 13/08* (2006.01)
(52) U.S. Cl. .................. 340/545.6; 340/542; 340/5.73; 70/263; 70/264
(58) Field of Classification Search .............. 340/545.6
See application file for complete search history.

(56) References Cited

U.S. PATENT DOCUMENTS

| | | | | |
|---|---|---|---|---|
| 5,347,515 A | * | 9/1994 | Marino | 370/447 |
| 5,705,979 A | * | 1/1998 | Fierro et al. | 340/506 |
| 5,721,530 A | * | 2/1998 | Right et al. | 340/521 |
| 5,747,885 A | * | 5/1998 | Dochtermann et al. | 307/10.2 |
| 5,808,555 A | * | 9/1998 | Bartel | 340/5.72 |
| 5,864,286 A | * | 1/1999 | Right et al. | 340/521 |
| 6,064,316 A | * | 5/2000 | Glick et al. | 340/5.7 |
| 6,078,256 A | * | 6/2000 | Gottlieb | 340/542 |
| 6,611,204 B2 | * | 8/2003 | Schmurr | 340/521 |
| 6,975,219 B2 | * | 12/2005 | Eryurek et al. | 340/524 |
| 6,999,825 B2 | * | 2/2006 | Inomata | 340/5.73 |
| 7,040,125 B2 | * | 5/2006 | Ciezki et al. | 70/208 |
| 2002/0022894 A1 | | 2/2002 | Eryurek et al. | |
| 2003/0141724 A1 | * | 7/2003 | Ramsauer | 292/348 |
| 2004/0089035 A1 | | 5/2004 | Ciezki et al. | |

OTHER PUBLICATIONS

Article, "Intelligente Sensoren und Aktoren".
Article, "Asi Im Ueberblick Actuator Sensor Interface Fuer Die Automation".
Article, "Feldbusfähige, Intellegente Sensoren".

* cited by examiner

*Primary Examiner*—Daniel Wu
*Assistant Examiner*—Eric M. Blount
(74) *Attorney, Agent, or Firm*—Robert W Becker & Associates; Robert W Becker

(57) ABSTRACT

The invention relates to an alarm and control system for at least one switch cabinet that can be opened and closed by an operator. Said switch cabinet comprises an electroactuated locking unit (17) for locking and releasing its door lock and a plurality of modules (12, 13, 14, 15, 16) that are interlinked via a data-exchange data bus (11) and that comprise respective signal-processing microprocessors. Said modules have a closed scope of functions, independently process the signals supplied to them and emit a decision signal as the result of processing.

12 Claims, 1 Drawing Sheet

ALARM AND CONTROL SYSTEM FOR A SWITCH CABINET

BACKGROUND OF THE INVENTION

The invention relates to an alarm, or monitoring, and control system for at least one switch cabinet that can be opened and closed by an operator.

An alarm and control system of this type is described in DE 200 06 373 U1; the core of this known alarm and control system is a single module with a microprocessor to which a plurality of function units are connected. Thus, input units such as a keyboard, a transponder unit, and/or an optical sensor for receipt of a finger print are connected to the module or, respectively, to its microprocessor, whereby the corresponding signals are processed in the microprocessor of the module such that the received signals are compared with verification codes stored in the microprocessor and the result is transmitted to an electrically functioning locking unit of the switch cabinet connected to the module as a control command commanding the release of the door lock controlled by the locking unit or, in the event of the absence of agreement between the received signal and the justification code, commanding the door lock to remain closed. In association therewith, further signal processing tasks are performed by the microprocessor; thus, the microprocessor controls the energy supply for all connected units, and furthermore, a connection to external network devices such as, for example, a mobile telephone network, is produced or, respectively, operated.

The disadvantage is connected with the known alarm and control system that the microprocessor forming the core of the module must be designed in correspondence with the respective prescribed function requirements and control requirements. As the requirement profiles can change during the lifetime of the switch cabinet or, respectively, during the lifetime of the installed alarm and control system, the microprocessor is, on the one hand, designed with a corresponding reserve in order to connect, as the occasion arises, to further function units and to perform additional signal processing. As a consequence thereof, the installed capacity reserve, which is connected with additional costs, remains unused during conditions in which there is no occurrence of an alteration. On the other hand, if the microprocessor is designed in correspondence with the actual requirements of the alarm and control system an its installation, an expansion of the requirement profiles is only possible if a new microprocessor with correspondingly larger processing capacity is deployed which is, in any event, expensive. A further disadvantage to be noted is that, with respect to the known alarm and control system, a disturbance of the function or, respectively, a fallout of the microprocessor leads to a fallout of the entire control of this switch cabinet that can have significant consequences for the operational security of such devices.

SUMMARY OF THE INVENTION

The invention offers a solution to the challenge of making an alarm and control system available for a switch cabinet that is more flexible in its design and by whose deployment the operational security of the system is collectively improved.

The solution to this challenge is to be found in the advantageous embodiments and configurations of the invention comprised in the subject matter of the patent claims which follow this description.

The invention provides, with respect to details thereof, an alarm and control system by which the switch cabinet comprises an electronically functioning locking unit for closing and releasing the switch cabinet door lock and by which is provided a plurality of modules with closed loop functioning scopes, each module having a respective microprocessor for signal processing, and the plurality of modules being connected via a data bus serving to provide exchanges of information and the modules processing independently of one another the signals conducted thereto and outputting a decision signal as the processing result.

The advantage is connected with the invention that the functions or, respectively, the function controls, that are to be installed in an alarm and control system are designed to be separate from one another and to be outfitted with organic intelligence in the form of installed microprocessors operating independently from one another, the modules each performing a self-contained closed signal processing loop. Thus, in accordance with the embodiments of the invention, separately operating operator modules, input modules, grip modules, control modules, communication modules, or sensor modules are provided each of which has available a respective organic microprocessor. The above-noted enumeration of the modules to be installed on the alarm and control system in correspondence with the respective requirement profile is not comprehensive; the listing permits recognition of the significant advantage offered by the inventive alarm and control system in contrast to the state-of-the-art that a change in the requirement profile can be taken into consideration in a simple manner and that additional modules having, as the occasion arises, an organic intelligence, can be integrated into the alarm and control system without having to undertake changes on the further, already available modules. As a consequence of this, the individual modules with their microprocessors can be accommodated to, and designed for, the individual requirements that are prescribed by the concrete signal processing tasks. As a further advantage, a disturbance in a module or, respectively, a falling-out of a module, does not negatively impact the additional functions of other modules or negatively impacts only those modules within the respective loop in which the decision signal outputted by the effected module is to be further processed. Thus, for example, two operator modules can be available that are so arranged that, upon the disturbance of an operator module, the control of the switch cabinet via the second operator module is, in any event, possible. Additionally, only one module needs to be exchanged out in such an event, without having to take into consideration exchange effects with the other connected functional units.

A further advantage exists in that the data exchange between the individual modules is limited to a minimum as the respective signal processing proceeds in a decentralized manner in each individual module; this opens up the possibility of conducting, with only a limited effort required, the data exchange in an encrypted manner. Also, the deployment of several identical modules with identical processing scopes as a security reserve or with parallel work scopes can be implemented in a simpler manner.

The alarm and control system is, in accordance with an embodiment of the invention, also deployable such that a plurality of switch cabinets are connected with one another via the data bus and, in each switch cabinet, modules with closed off function scopes are arranged whose decision signal is to be transferred to the subsequently-operating modules of other switch cabinets.

With respect to details thereof, in accordance with one embodiment of the invention, an operator module connected to an input keyboard can be provided in whose microprocessor the input of a number combination via the keyboard is verified; in this connection, the respective number combination that opens access when justified by comparison of an input number combination thereto, can be deposited in the microprocessor of the operator module; an alternative possibility resides in having the microprocessor of the operator module access, via the data bus, an externally connected data bank in which the access justification-opening numerical combination is deposited. In any event, there then follows the comparison of the number combination up to the outputting of a yes/no decision signal result in the microprocessor of the operator module. As a consequence thereof, the deployment of several operator modules with the same or with different function scopes is possible.

Correspondingly, in accordance with an embodiment of the invention, at least one input unit connected to an input unit configured as an optical sensor or as a transponder device can be provided alternatively to, or in addition to, an operator module operated together with an input keyboard. Also, there follows the confirmation of the access justification via corresponding signal processing in the microprocessor of the input module.

In accordance with the invention, at least one grip module that controls the function of the electrically functioning locking unit for closing or releasing the door lock of the switch cabinet is provided, whereby the grip module is active in response to the decision signal of an operator module and/or an input module and controls at least one locking unit of a door lock. The grip module can be configured for this purpose to control in a groupwise manner a plurality of locking units for several locks that are arranged in a switch cabinet but which can be, as well, arranged in different additional switch cabinets connected via the data bus.

In accordance with an embodiment of the invention, at least one communication module with a capability for communicating with external communication devices is provided via which, in a known manner, data that concerns the conditions of the individual modules can be transmitted to external net devices.

Moreover, at least one control module that controls the energy supply of the module and/or the locking units is provided, whereby the connection to a network component is only effected via this corresponding control module. This control module can, in a manner similar to the state-of-the-art control described in DE 200 06 373 U1, control the energy supply of the individual modules in accordance with respective requirements.

In accordance with an embodiment of the invention, at least one sensor module connected to sensors for receiving information concerning environmental influences created in and/or on the switch cabinet can be provided. In connection with the environmental influences to be captured, these can relate to, for example, the temperature or the moisture in the interior of the switch cabinet, the development of smoke, or vibrations that occur. The electrical power conducted from the network into the switch cabinet is to be counted as well as an environmental influence that requires a control. Different sensors are to be arranged with respect to the various environmental influences, the signals of such sensors being transmitted to a central sensor module in which such signals are processed into a decision signal. It can, however, also be provided that a sensor module is connected, respectively, to each individual sensor or is connected to sensors arranged together in a groupwise manner.

Finally, it can also be provided, in accordance with an embodiment of the invention, that at least one externally arranged databank is connected to the data bus, into which corresponding signals from the individual modules can be transmitted or in which base data is stored that the modules can or must access per the respective requirement profile.

The arrangement of the decentralized modules with their own organic microprocessors further provides, in an advantageous manner, the possibility of configuring an automatic, cyclic test circuit for monitoring of the function of the individual modules in order to recognize error sources in a timely manner. In any event, the individual modules can be configured in an advantageous manner to be programmable within their function scopes, whereby, as well, a software update of the modules via the data bus is provided. In total, within the alarm and control system, the deployment is possible of modules influencing the core functions as well as modules that are customer specific and, as such, are use-oriented, so that the inventive alarm and control system can be variably accommodated to the requirements as a function of the special deployment conditions of a switch cabinet.

BRIEF DESCRIPTION OF THE DRAWINGS

In the drawing, an embodiment of the invention is shown. The sole FIGURE of the drawings shows a switch cabinet with the modules allocated thereto in a schematic representation.

DESCRIPTION OF SPECIFIC EMBODIMENTS

Figure 1:
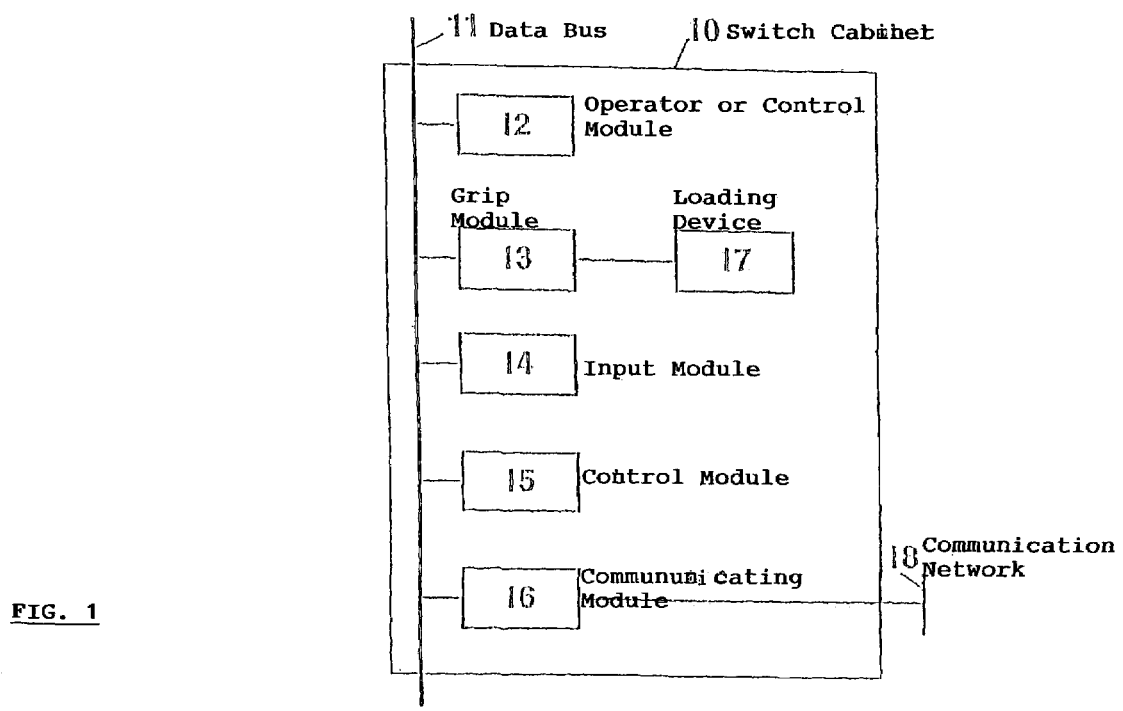

A switch cabinet is designated as switch cabinet 10, and is coupled to the data bus 11; as the occasion arises, the data bus also leads to further switch cabinets 10. In the context of the illustrated switch cabinet 10, an operator or control module 12 with its own organic microprocessor is connected to the data bus 11, the function of this module having already been described. The same applies as well for a grip module 13 that is coupled, in addition to its connection to the data bus 11, as well with a locking device 17 for a not-illustrated door lock of the switch cabinet, so that a corresponding release signal can be transmitted to the locking unit 17.

Furthermore, an input module 14 and a control module 15 are connected to the data bus 11, as well as a communication module 16, that, in addition to its connection to the data bus 11, is connected via a further connection with an external communication network 18. The individual functions of the above-noted modules have been described herein above.

The features of the subject matter of this case as set forth in the herein above description, the patent claims, the summary, and the drawings, can be important individually or in desired combinations with one another in order to realize the invention in its various forms.

The specification incorporates by reference the disclosure of German priority document 202 04 858.6 filed Mar. 26, 2002 and PCT/DE03/00928 filed Mar. 20, 2003.

The present invention is, of course, in no way restricted to the specific disclosure of the specification and drawings, but also encompasses any modifications within the scope of the appended claims.

The invention claimed is:

1. An alarm and control system for a switch cabinet that can be opened and closed by an operator and that includes an electronically functioning locking unit for closing and releasing the switch cabinet door lock, the alarm and control system comprising:

a data bus serving to provide exchanges of information; and a plurality of modules disposed in the switch cabinet and connected via the data bus, each module having a respective microprocessor for signal processing and a respective closed loop function scope, each module being designed only for the control of an individual function, and the modules processing independently of one another the signals conducted thereto and outputting a decision signal as a processing result.

2. A system according to claim 1, wherein a plurality of switch cabinets are connected with one another via the data bus and, in each of the switch cabinets, modules with closed loop function scopes are arranged whose decision signal is transmittable to the subsequently-operating modules of different switch cabinets.

3. A system according to claim 1 and further comprising at least one operator module connected to an input keyboard.

4. A system according to claim 1 and further comprising at least one input module connected to an input unit configured as an optical sensor or as a transponder device.

5. A system according to claim 1 and further comprising at least one grip module controlled as a function of the locking unit for the door lock.

6. A system according to claim 5, wherein a plurality of door locks configured on the switch cabinets are connected to the grip module.

7. A system according to claim 2, wherein a plurality of further locking units that are coupled to other switch cabinets via the data bus are connected to a grip module of a switch cabinet.

8. A system according to claim 1 and further comprising at least one communication module communicating with external communication devices.

9. A system according to claim 1 and further comprising at least one control module for controlling the energy supply of the module and/or the locking units.

10. A system according to claim 1 and further comprising at least one sensor module connected with sensors for capturing environmental influences produced on or in a switch cabinet.

11. A system according to claim 10, wherein each sensor operable to capture a defined environmental influence is provided with its own sensor module.

12. A system according to claim 1 and further comprising an external arranged databank connected to the data bus.

* * * * *